US009176683B2

United States Patent
Nakamura et al.

(10) Patent No.: US 9,176,683 B2
(45) Date of Patent: Nov. 3, 2015

(54) IMAGE INFORMATION PROCESSING METHOD, IMAGE INFORMATION PROCESSING APPARATUS AND COMPUTER-READABLE RECORDING MEDIUM STORING IMAGE INFORMATION PROCESSING PROGRAM

(71) Applicant: BROTHER KOGYO KABUSHIKI KAISHA, Nagoya-shi, Aichi-ken (JP)

(72) Inventors: Tomoki Nakamura, Kasugai (JP); Kodai Mizuno, Hekinan (JP); Eriko Takahashi, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/605,259

(22) Filed: Jan. 26, 2015

(65) Prior Publication Data
US 2015/0212762 A1    Jul. 30, 2015

(30) Foreign Application Priority Data

Jan. 27, 2014    (JP) .................................. 2014-012477

(51) Int. Cl.
G06F 15/00    (2006.01)
G06F 3/12    (2006.01)
G06K 1/00    (2006.01)

(52) U.S. Cl.
CPC ............ *G06F 3/1204* (2013.01); *G06F 3/1253* (2013.01); *G06F 3/1268* (2013.01)

(58) Field of Classification Search
CPC .... G06F 3/1204; G06F 3/1253; G06F 3/1268
USPC ........................................ 358/1.1, 1.15, 1.13
See application file for complete search history.

(56) References Cited

U.S. PATENT DOCUMENTS

| 5,819,261 A | 10/1998 | Takahashi et al. | |
| 2013/0076705 A1* | 3/2013 | Murata | 345/204 |
| 2013/0106903 A1* | 5/2013 | Nagata et al. | 345/619 |

FOREIGN PATENT DOCUMENTS

| JP | 8-314954 A | 11/1996 |
| JP | 2013-175214 A | 9/2013 |
| JP | 2013-178847 A | 9/2013 |

* cited by examiner

*Primary Examiner* — Douglas Tran
(74) *Attorney, Agent, or Firm* — Merchant & Gould PC (57) ABSTRACT

An image information processing device has a controller which is configured to display images represented by the image files included in a target image group selected by a user on the display unit sequentially at particular switching intervals. The controller detects whether one of a plurality of specific flick operations is performed during execution of the switching-displaying process. When it is determined that one of a plurality of specific flick operations is performed, one of the plurality of associated processes to be applied to an image which is currently displayed on the display unit is executed.

12 Claims, 7 Drawing Sheets

FIG. 8

IMAGE INFORMATION PROCESSING METHOD, IMAGE INFORMATION PROCESSING APPARATUS AND COMPUTER-READABLE RECORDING MEDIUM STORING IMAGE INFORMATION PROCESSING PROGRAM

CROSS-REFERENCE TO RELATED APPLICATION

This application claims priority under 35 U.S.C. §119 from Japanese Patent Application No. 2014-012477 filed on Jan. 27, 2014. The entire subject matter of the application is incorporated herein by reference.

BACKGROUND

1. Technical Field

The present disclosures relate to an image information processing apparatus, an image processing method and a non-transitory computer-readable recording medium storing an image information processing program.

2. Related Art

When an image capturing operation is executed with a digital camera or a mobile communication terminal having a camera function, generally, data of the captured images is stored in a built-in memory of the device (i.e., the digital camera or the mobile communication terminal) or in a memory card as image files. The image files thus stored can be edited and/or displayed with application software installed in the digital camera or the mobile terminal.

When the image files are stored in the memory card, simply by inserting the memory card in another information processing device, various types of predetermined processes can be applied to the image files in the information processing device with use of an image file management application implemented in the image processing device. When the image processing device is connected with a printing device, or when the image processing device itself has a printing function, it is possible to have the printer or the printing device print the image.

SUMMARY

Generally, the image file management application is configured such that, when a user wishes to select images and print the same, or to select unnecessary images and delete the same, the user needs to display a folder including such images, display the files in the folder, and select files one by one and applies a process to the selected file.

Such a conventional method is very troublesome since it is necessary to open a plurality of pieces of image data in the folder one by one to check/determine whether the image needs to be deleted or printed.

It is well-known to display thumbnails of the plurality of pieces of image data as a list of the plurality of images. However, the thumbnail image is relatively small, and it is sometimes difficult for the user to confirm the contents of the actual image based on such a small image. In particular, when there are a plurality of images which look substantially similar to each other, if the user wishes to select a particular image from among the plurality of substantially similar images, it becomes necessary for the user to open the plurality of images one by one.

Aspects of the present disclosures provide an improved image information processing apparatus, an improved image processing method and a computer-readable recording medium storing an improved image information processing program.

According to aspects of the disclosures, there is provided a non-transitory computer-readable recording medium storing an image information processing program which represents computer-executable instructions that cause a controller of an image information processing device to execute an image information processing, the image information processing device having an obtaining unit configured to obtain an image file which is a data file representing an image, and a display unit configured to display the image, a touch panel arranged to overlay an image display area of the display unit, an operation detecting unit configured to detect an user input to the touch panel, and a controller configured to execute operations in accordance with the image information processing program. When executed by the controller, the plurality of instructions causing the controller to set an image file group, which includes at least one image file obtained by the obtaining unit, to be a target image group, display images represented by the image files included in the target image group on the display unit sequentially at particular switching intervals, determine whether one of a plurality of specific flick operations is performed, the specific flick operations being flick operations in particular directions, during displaying the images on the display unit sequentially, and execute one of the plurality of associated processes to be applied to the image file representing an image which is currently displayed on the display unit when it is determined that one of the plurality of specific flick operations is performed.

According to aspects of the disclosures, there is also provided an image information processing method, which has the steps of setting at least one image file to be a target image file, displaying images represented by the at least one image file on a displaying device sequentially at particular switching intervals, determining whether one of a plurality of specific flick operations is performed, the specific flick operations being flick operations in particular directions, during displaying the images on the display unit sequentially; and executing one of a plurality of associated processes being to be applied to the image file representing an image which is currently displayed on the display unit when it is determined that one of the plurality of specific flick operations is performed.

According to aspects of the disclosures, there is also provided an image information processing device, which is provided with an obtaining unit configured to obtain an image file which is a data file representing images, a display unit configured to display the images, an operation detection unit configured to detect a user operation with respect to the display unit, and a controller. The controller is configured to set an image file group, which includes at least one image file obtained by the obtaining unit, to be a target image group, display images represented by the image files included in the target image group on the display unit sequentially at particular switching intervals, determine whether one of a plurality of specific flick operations is performed, the specific flick operations being flick operations in particular directions during displaying the images on the display unit sequentially, and execute one of the plurality of associated processes to be applied to the image file representing an image which is currently displayed on the display unit when it is determined that one of the plurality of specific flick operations is performed.

DETAILED DESCRIPTION OF EXEMPLARY EMBODIMENT

Hereinafter, referring to the accompanying drawings, an exemplary embodiment according to aspects of the disclosures will be described.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

Figure 1:
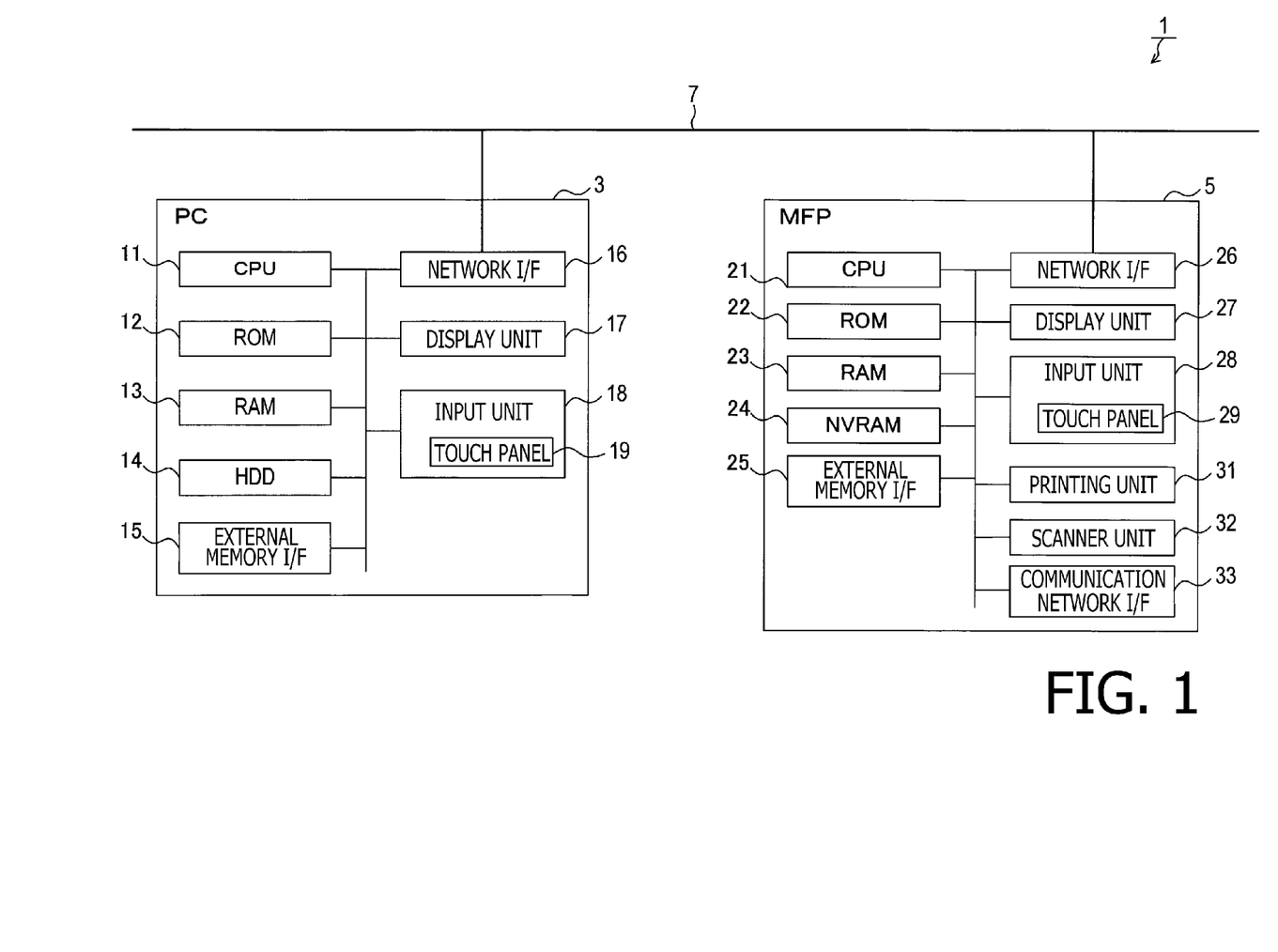
FIG. 1 is a block diagram showing a schematic configuration of an image processing system according to aspects of the disclosures.

As shown in FIG. 1, an information processing system 1 according to the exemplary embodiment includes a personal computer (hereinafter, referred to as a PC) 3, and a multifunction peripheral (hereinafter, referred to as an MFP) 5. The PC 3 and the MFP 5 are connected through a network 7 such that data communication can be performed therebetween via the network. According to the exemplary embodiment, the network is a wired LAN (local area network). It is noted that the wired LAN is only an example, and the network 7 can be of another type.

Each of the PC 3 and the MFP 5 is configured to connect with the Internet via the network 7. Accordingly, each of the PC 3 and the MFP 5 is capable of performing the data communication with an external device (e.g., a server) which is connected to the Internet.

The PC 3 has a CPU (central processing unit) 11, a ROM (read only memory) 12, a RAM (random access memory) 13, an HDD (hard disk drive) 14, an external memory I/F (interface) 15, a network I/F 16, a display unit 17 and an input unit 18.

The CPU 11 is configured to execute programs stored in the ROM 12 and/or HDD 14 to control components of the PC 3. For example, in the ROM 12, various programs to be executed by the CPU 11 and various pieces of data are stored, and the RAM 13 is typically used as a main memory device when the CPU 11 executes various processes. The network I/F 16 is a communication module used for performing various types of data communication with the external devices via the network 7. The display unit 17 is provided with a displaying device such as an LCD (liquid crystal display).

The input unit 18 is provided with well-known mouse and keyboard (not shown in FIG. 1). Further, according to the exemplary embodiment, the input unit 18 is provided with a touch panel 19. The touch panel 19 is a transparent film type device which is capable of detecting contact (touch) operations with a designating member such as a finger or a touch pen. According to the exemplary embodiment, the touch panel 19 is arranged to overlap an image display area of the display unit 17.

When the touch panel 19 detects a contact of the designating member, a contact detection signal representing coordinates of a contact position, at which the designating member contacts, is transmitted from the touch panel 19 to the CPU 11. When the designating member 19 becomes out of contact from the touch panel 19, the contact detection signal input to the CPU 11 is terminated. Thus, the CPU 11 is capable of detecting various types of touch operations of the designating member based on presence/absence and characteristics of the contact detection signal. For example, the CPU 11 is capable of detecting a tap operation, a flick operation, a pinch-in/pinch-out operation and the like. Among the touching operations above, the flick operation is, as is well-known, an operation to quickly slide the designating member on the touch panel 19.

When the designating member contacts the touch panel 19, the CPU 11 periodically detects the coordinates of the contacting position of the designating ember based on the contact detection signal transmitted from the touch panel 19. Based on whether the contacting position of the designating member is changed, and how the contacting position is changed when it is changed, the CPU 11 calculates a moving direction, a moving speed and a moving acceleration. For example, when the designating member, which has been contacting the touch panel 19, becomes out of contact, the CPU 11 is capable of calculating the moving direction, moving speed and moving acceleration when the designating member is released from the touch panel 19 based on the coordinates immediately before the designating member is released, the previously detected coordinates, and chronological change of the plurality of coordinates.

Then, based on the thus calculated moving direction, moving speed and moving acceleration, the CPU 11 determines what kind of touch operation is performed. For example, when the moving speed when the designating member is released is equal to or greater than a predetermined threshold speed, or the acceleration when the designating member is released is equal to or greater than a predetermined threshold acceleration, the CPU 11 determines that the flick operation is performed. It is noted that such a determination method is only an exemplary one, and occurrences and directions of the flick operations may be detected with use of other methods.

In the following description, a movement of bringing the designating member 19 in contact with the touch panel 19 will also be referred to as a "touchdown" and a movement of the designating member 19 to be released from the touch panel 19 will be referred to as a "touch release." Further, as described above, the touch panel 19 is arranged to overlap the image display area of the display unit 17. Therefore, in the following description, a touchdown on the touch panel 19 and/or a touch release from the touch panel 19 at a position where a certain image is displayed on the display area of the display unit 17 will be simply expressed as a touchdown on an image and/or a touch release from an image.

In the HDD 14, an OS (operation system) and various applications are stored (i.e., installed). As one of the applications installed in the HDD 14, there is a slideshow application. The slideshow application functions to display a plurality of images selected by a user in a sequentially switched manner on the display unit 17.

The external memory I/F 15 functions as an interface which controls storing and/or retrieving of data with respect to various types of external storage media such as a CD-ROM, a DVD-ROM, CD-R, a DVD-R and the like.

The MFP 5 is a peripheral device having a multiple functions such as a scanner function to scan an image on an original, a printer function to form (i.e., print) an image on a printing medium such as a printing sheet, an OHP (overhead projector) sheet and the like.

The MFP 5 has a CPU 21, a ROM 22, a RAM 23, an NVRAM (non-volatile RAM) 24, an external memory I/F 25, a network I/F 26, a display unit 27, an input unit 28, a printing unit 31, a scanning unit 32, and a communication network I/F 33.

The CPU 21 controls operations of components of the MFP 5 in accordance with programs stored in the ROM 22 and/or NVRAM (non-volatile RAM) 24. The RAM 23 is mainly used as a work area that stores various pieces of data, and a main memory that stores the image data. The NVRAM 24 is configures such that stored contents can be electrically rewritten, and stores firmware, setting values, various programs and various pieces of data.

The display unit 27 is provided with displaying devices such as an LCD and LED's (light emitting diodes). The input unit 28 is provided with a touch panel 29 and operation buttons (not shown), through which the user can input operation commands. The touch panel 29 is a transparent film-like device arranged to overlap an image display area of the display unit 27. The printing unit 31 is capable of forming (i.e., printing) an image on a recording media such as the printing sheet. The scanning unit 32 is provided with an image sensor and scan an image on the original to generate image data representing the image.

The network I/F 26 is a communication module used to perform various types of data communication with external devices (e.g., PC 3) via the network 7. The communication network I/F 33 is a network interface used to communicate with external communication devices (e.g., a telephone, a facsimile machine, etc.) through a communication network (not shown). The external memory I/F 25 is an interface used to control storing/retrieving of data with respect to various types of memory cards.

According to the exemplary embodiment, the slideshow application has a slideshow function for displaying a plurality of images in a sequentially switched manner. Further, the slideshow application has an enhanced function for receiving various processes related to the displayed images and/or image switching intervals.

A general description of the enhanced function will be given. For example, when a slideshow is being performed, if the user performs an upper-right flick operation (i.e., a flick operation to move the designating member from a lower-left position to an upper-right position), the image currently displayed is set as an image subject to print (hereinafter, referred to as a print-target image). For another example, when a lower-right flick operation is performed, the currently displayed image is set as an image subject to delete (hereinafter, referred to as a deletion-target image). For a further example, when a flick operation in a predetermined direction is performed, the image switching interval of the slideshow is changed.

The image data representing the images, which are set to be print-target images, are transmitted to the MFP 5 after completion of the slideshow, and the images will be printed by the MFP 5. Image data representing the images set to be deletion-target images will be deleted after completion of the slideshow.

Figure 2:
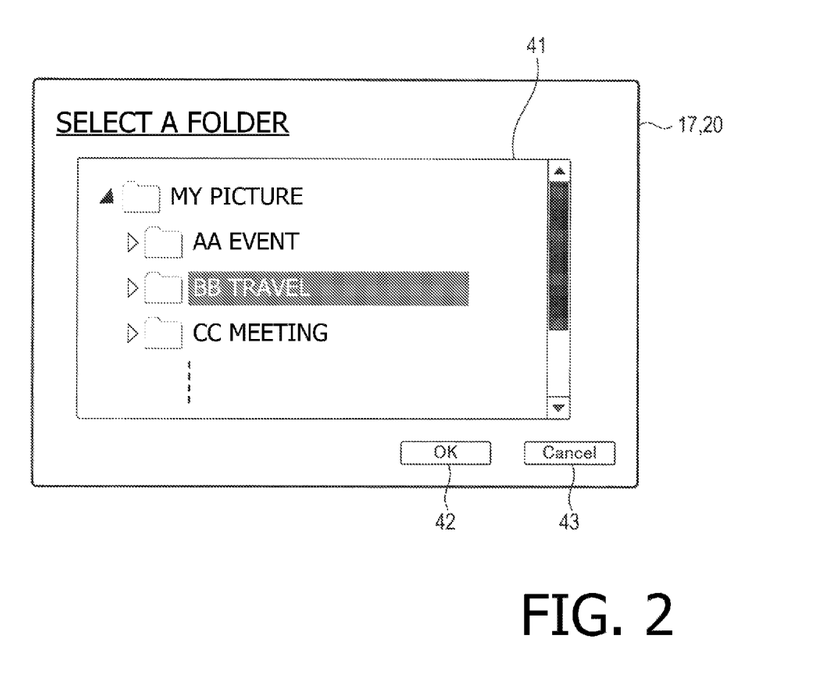
FIG. 2 is a selection screen receiving a user's selection of a folder.

When the user starts the slideshow application, a selection window 41 is displayed on the display unit 17 of the PC 3 as shown in FIG. 2. The selection window 41 is for encouraging the user to select images subject to the slideshow. Below the selection window 41, an OK button 42 and a cancel button 43 are displayed. When the user touches the cancel button 43, the slideshow application is terminated.

In the selection window 41, a list of folders which are managed by the PC 3 is displayed. For example, in the selection window 41, all the accessible folders (i.e., the folders the PC 3 can access) are displayed as a list. Such folders may include folders stored in the HDD 14, folders in the storage medium which is inserted in the external memory I/F 15, folders inside the external devices which are accessible via the network 7.

The user is capable of selecting one of the folders, of which the images are subject to the slideshow, from among a plurality of folders displayed in the selection window 41 by the touching operation and/or with use of the mouse. FIG. 2 shows an example of the selection window 41 in which "BB travel" folder is selected. When one folder is selected and the OK button 42 is clicked, the selected folder is determined as the folder subject to the slideshow. That is, when the BB travel folder is subject to the slideshow, all the image files (i.e., image file group) included in the BB travel folder are subject to the slideshow.

When a folder subject to the slideshow (hereinafter, referred to as a slideshow subject folder) is determined, the slideshow is started. That is, the image files subject to the slideshow are displayed, one by one, with switched at predetermined switching intervals.

Figures 3A, 3B:
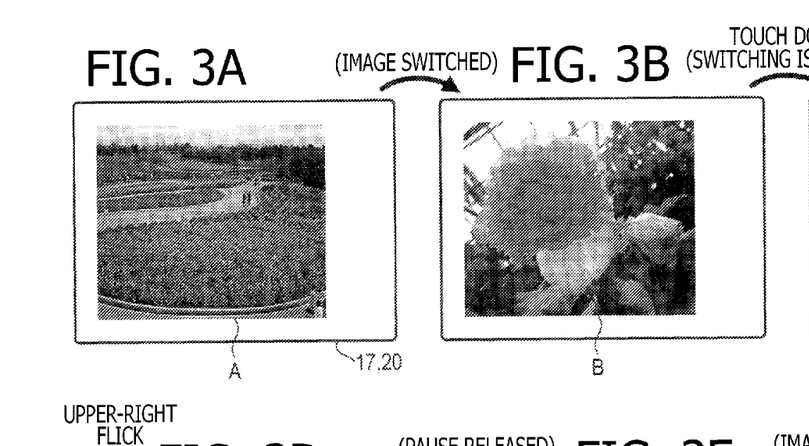
FIGS. 3A-3F illustrate how a slide show application works.
Figure 3C:
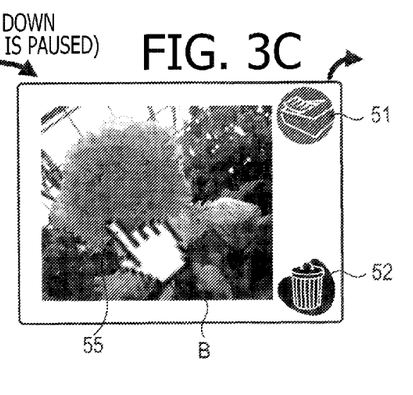

FIG. 3A shows a state where image A, which is one the images subject to the slideshow, is displayed on the display unit 17. When the switching interval has elapsed after image A was displayed, the displayed image is switched to next image B as shown in FIG. 3B. If the user touches down on image B with the designating member such as a finger 55 of the user when image B is being displayed, the switching of the images is temporarily stopped (i.e., the slideshow is temporarily paused). Thereafter, as shown in FIG. 3C, a print icon 51 is displayed at an upper right corner area of the image displaying area, and a deletion icon 52 is displayed at a lower right corner area of the image displaying area.

Figure 3D:
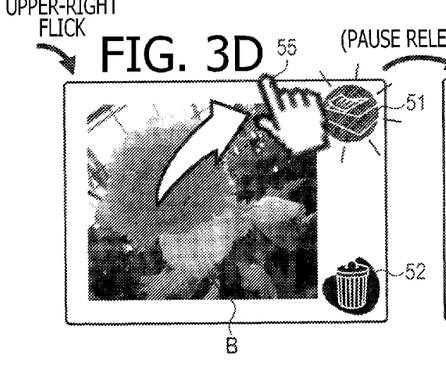

If the user performs flick operation to move the designating member (e.g., the finger 55) in the upper right direction after the user touches down the designating member on the image B, the print icon 51 blinks as illustrated in FIG. 3D. At this stage, the image B is set to be the print-target image. Specifically, in a print stack list stored in the RAM 13, the image B (i.e., the image data representing the image B) is added.

Although not shown in any one of FIGS. 3A-3F, if the user performs the flick operation in the lower right direction, the deletion icon 52 blinks. In this case, the image B, which is being displayed, is set to be the deletion-target image. Specifically, in a deletion stack list which is stored in the RAM 13, the deletion-target image is added.

Figures 3E, 3F:
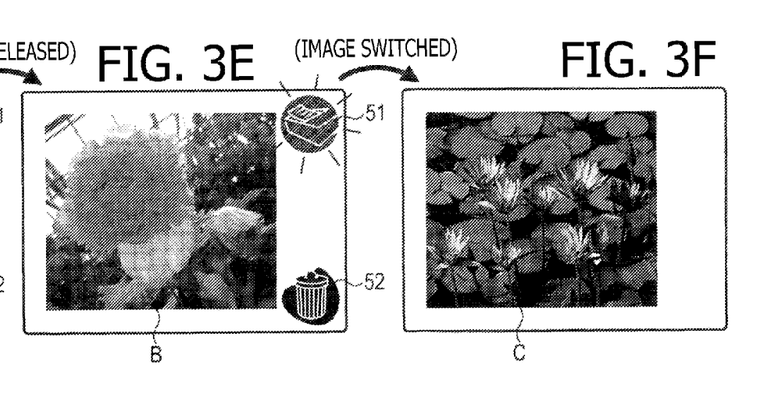

As shown in FIG. 3D, when the user performed the flicking operation in the upper right direction, and the image B has been set to be the print-target image, the temporarily stopped status of the slideshow is released (i.e., the slideshow is restarted). It is noted that, after the slideshow is restarted, when the image B is being displayed, the print icon 51 keeps blinking (see FIG. 3E). When the switching interval has elapsed, the displayed image is switched to image C as shown in FIG. 3F. When the image has been switched to image C, the print icon 51 and the deletion icon 52 disappear from the display unit 17.

As described above, the user can set the image being displayed to be the print-target image or the deletion-target image with the flick operation. Further, when the user performs the tap operation, the slideshow is terminated. The images having been added to the print stack list are transmitted to the MFP 5 and printed thereby. The images having been added to the deletion stack list are deleted after termination of the slideshow.

Although not shown in anyone of FIGS. 3A-3F, when an image is being displayed, and the currently displayed image has already been included in the print stack list or the deletion stack list, the icon (i.e., the print icon 51 or the deletion icon 52) corresponding to the displayed image blinks.

If image A has already been included in the deletion stack list, and the displayed image is changed from another image to image A, the deletion icon 52 blinks. At this stage (i.e., when the deletion icon 52 is blinking), if the user performs the flick operation in the upper left direction, the deletion icon 52 stops blinking, and the image A is removed from the deletion stack list. As above, an image once set to be the deletion-target image can be removed from the deletion-target images.

There would be various methods for determining the direction of the flick operation from among the upper right direction, upper left direction, lower right direction and lower left direction. As described above, at the time of touch release, the CPU 11 determines a moving direction of the designating member. Therefore, the CPU 11 can determines whether the moving direction is one of the upper right direction, upper left direction, lower right direction and lower left direction, or none of the above directions.

For example, given that angular range (0 degree-360 degrees) is defined with respect to an origin which is a position where the designating member is released, an angular range between 30 degrees to 90 degrees (one o'clock-three o'clock direction) may be defined as an upper right range. That is, if the moving direction of the designating member after the touch release is within the angular range between 30 degrees and 90 degrees, the CPU 11 determines that the moving direction is the upper right direction.

Similarly, an angular range between −30 degrees and −90 degrees (nine o'clock-eleven o'clock direction) may be defined as an upper left range. That is, if the moving direction of the designating member after the touch release is within the angular range between −30 degrees and −90 degrees, the CPU 11 determines that the moving direction is the upper left direction.

Similarly, an angular range between −30 degrees and −90 degrees (four o'clock-six o'clock direction) may be defined as a lower right range. That is, if the moving direction of the designating member after the touch release is within the angular range between −30 degrees and −90 degrees, the CPU 11 determines that the moving direction is the lower right direction.

Further, an angular range between 90 degrees and 150 degrees (twelve o'clock-ten o'clock direction) may be defined as an upper left range. That is, if the moving direction of the designating member after the touch release is within the angular range between 90 degrees and 150 degrees, the CPU 11 determines that the moving direction is the upper left direction.

Furthermore, an angular range between −90 degrees and −150 degrees (six o'clock-nine o'clock direction) may be defined as a lower left range. That is, if the moving direction of the designating member after the touch release is within the angular range between −90 degrees and −150 degrees, the CPU 11 determines that the moving direction is the lower left direction.

It is noted that the above angular ranges are exemplary ones and may be modified. Further, above method is an exemplary one, and any other suitable methods may be used to determine the direction of the flick operation.

Figure 4:
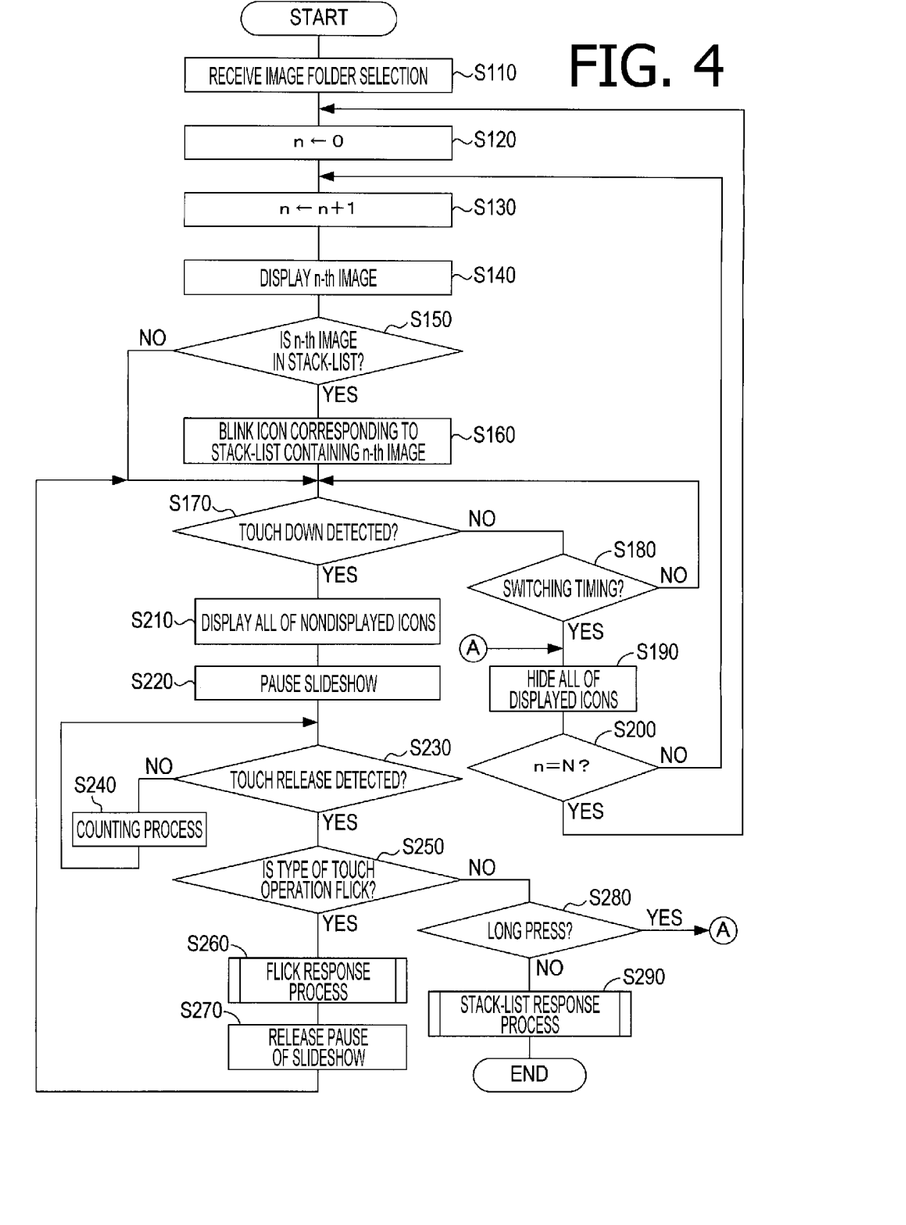
FIG. 4 is a flowchart illustrating a slideshow control process according to aspects of the disclosures.

Hereinafter, referring to flowcharts shown in FIGS. 4-8, the slideshow application will be described in detail. When the user inputs a command to start the slideshow application, the CPU 11 of the PC 3 retrieves a program of the slideshow application (e.g., a slideshow control process) from the HDD 14. FIG. 4 shows a flowchart illustrating a slideshow control process.

When the slideshow control process shown in FIG. 4 is started, the CPU 11 executes a image folder selection receiving process in S110. According to the exemplary embodiments, in the image folder selection receiving process, a selection screen as shown in FIG. 2 is displayed on the display unit 17, and a user selection of a folder subject to the slideshow (i.e., the files inside the folder are set to be display-target files). When the user selects one folder in S110, all the files in the selected folder are set to be the display target files of the slideshow. The CPU 11 calculates a sum N of the display-target files and retains the same. Further, the CPU 11 determines a switching order of the images (i.e. an order of the images when a slideshow is executed). Further, the CPU 11 sets predetermined areas in the RAM 13 as storage areas for storing the print-stack list and the deletion-stack list, respectively.

In S120, the CPU 11 initializes a variable n (i.e., sets the variable n to zero). In S130, the CPU 11 increments the variable n by one (i.e., add one to a current value of the variable n). In S140, the CPU 11 displays an n-th image in accordance with the order of the images described above on the display 17. As S140 is firstly executed after the slideshow application is started, the slideshow starts.

In S150, the CPU 11 determines whether the n-th image, which is currently displayed, is included in one of the stack lists (i.e., the print-stack list or the deletion-stack list). When the n-th image is not included in any of the stack lists (S150: NO), the CPU 11 proceeds to S170. When the n-th image has already been included in one of the stack lists (S150: YES), the CPU 11 proceeds to S160. In S160, the CPU 11 causes the icon corresponding to the stack list in which the n-th image is included to blink on the display unit 17. For example, when the n-th image has been included in the print-stack list, as shown in FIG. 3D, the print icon 51 displayed at the upper right corner of the image display area of the display unit 17 is caused to blink.

In S170, the CPU 11 determines whether the touchdown of the designating member is detected. When the touchdown has not been detected (S170: NO), the CPU 11 determines whether an elapsed time from a timing when the n-th image was displayed in S140 has reached the switching period. It is noted that, in this elapsed time does not include a period the slideshow is temporarily stopped (i.e., a period from a beginning of pause of the slideshow to a release of the pause of the slideshow), which will be described later.

In S180, if the elapsed time has not reached the switching timing (S180: NO), the CPU 11 returns to S170. If the elapsed time has reached the switching timing (S180: YES), the CPU 11 causes all the icons displayed on the display unit 17 in non-displayed state (S190). If no icons are displayed on the display unit 17 when S190 is executed, the CPU 11 retains the displaying status as it is.

In S200, the CPU 11 determines whether the variable n is equal to the sum N of the images. That is, the CPU 11 determines whether the currently displayed image is the last image, in accordance with the order of the slideshow. If the variable n has not reached the sum N (S200: NO), the CPU 11 returns to S130. In this case, the image currently displayed is to be switched to a next image in accordance with the order of the slideshow.

When the touchdown is detected (S170: YES), the CPU 11 displays all the icons which are not being currently displayed on the display unit 17. For example, when no icons are displayed at all, the CPU 11 displays all the icons (i.e., the two icons 51 and 52). For another example, when the deletion-icon 52 blinks on the display unit 17, the CPU 11 further displays the print icon 51 with retaining the blinking of the deletion icon 51.

The CPU 11 determines, in S230, whether the touch release of the designating member is detected. When the touch release has not been detected (S230: NO), that is, when the designating member still keeps contacting the touch panel 19, the CPU 11 executes a count process in S240, and returns to S230. The count process in S240 is a process to measure a contacting period, or an elapsed time from a timing of detection of the touchdown in S170.

When the touch release is detected (S230: YES), the CPU 11 determines whether the touch operation performed by the designating member is the flick operation. When the flick operation has been performed (S250: YES), the CPU 11 executes a flick-responding process in S260. Details of the flick-responding process is illustrated in FIG. 5.

Figure 5:
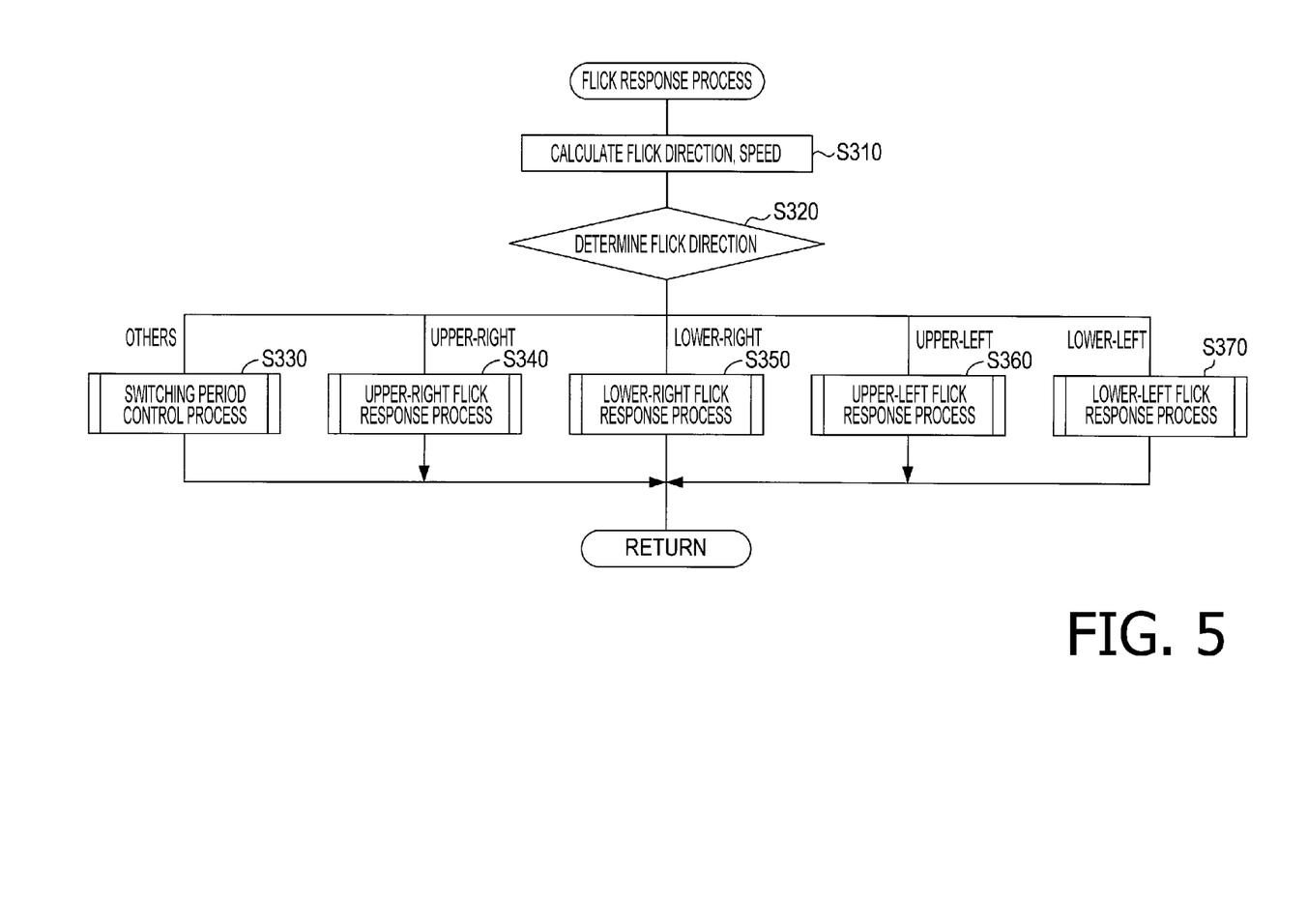
FIG. 5 is a flowchart illustrating a flick-response process which is called in the slideshow process shown in FIG. 4.

As shown in FIG. 5, when the CPU 11 proceeds to the flick-responding process, in S310, the CPU 11 determines a flick direction and a flick speed of the flick operation when the designating member was released. It is noted that the flick speed obtained at this stage is used in S331 of a switching interval control process which will be described later referring to FIG. 7.

In S320, the CPU 11 determines the process based on the flick direction determined in S310. When the flick direction is the upper right direction, the CPU 11 executes an upper right flick-responding process in S340, and proceeds to S270 (see FIG. 1). When the flick direction is the lower right direction, the CPU 11 executes a lower right flick-responding process in S350, and proceeds to S270. When the flick direction is the upper left direction, the CPU 11 executes an upper left flick-responding process in S360, and proceeds to S270. When the flick direction is the lower left direction, the CPU 11 executes a lower left flick-responding process in S370, and proceeds to S270. When the flick direction is none of the above four directions, the CPU 11 executes a switching interval control process in S330 and proceeds to S270.

Figure 6A:
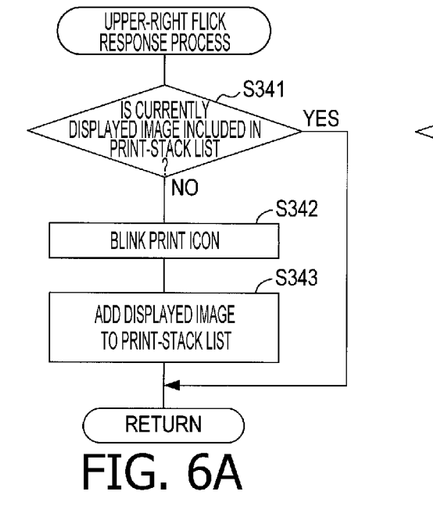
FIGS. 6A-6D show flowcharts illustrating flick-response operations called in the flick-response process shown in FIG. 5.

The upper right flick responding process (S340) is shown in FIG. 6A. As illustrated, when the CPU 11 proceeds to the upper right flick responding process, the CPU 11 determines whether the image currently being displayed has been included in the print-stack list (S341). When the displayed image has been included in the print-stack list (S341: YES), the CPU 11 terminates the upper right flick responding process. When the displayed image is not included in the print-stack list (S341: NO), the CPU 11 causes the print icon 51 to blink in S342. In S343, the CPU 11 adds the image currently displayed to the print-stack list.

Figure 6B:
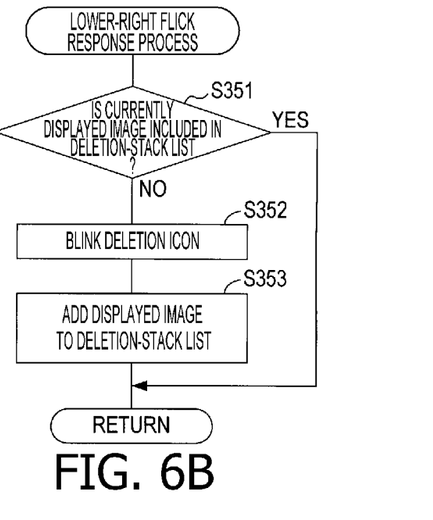

The lower right flick responding process (S350) is shown in FIG. 6B. As illustrated, when the CPU 11 proceeds to the lower right flick responding process, the CPU 11 determines whether the image currently being displayed has been included in the deletion-stack list (S351). When the displayed image has been included in the deletion-stack list (S351: YES), the CPU 11 terminates the lower right flick responding process. When the displayed image is not included in the deletion-stack list (S351: NO), the CPU 11 causes the deletion icon 52 to blink in S342. In S343, the CPU 11 adds the image currently displayed to the deletion-stack list.

Figure 6C:
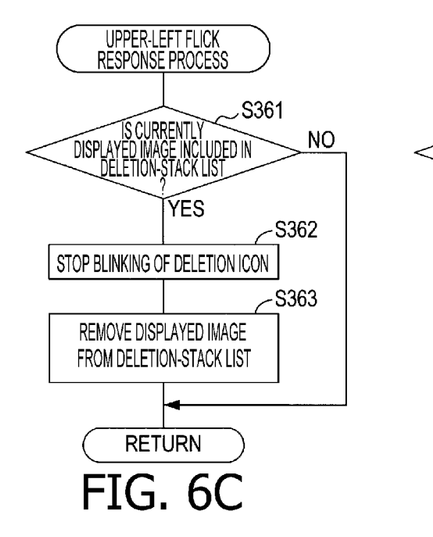

The upper left flick responding process (S360) is shown in FIG. 6C. As illustrated, when the CPU 11 proceeds to the upper left flick responding process, the CPU 11 determines whether the image currently being displayed is included in the deletion-stack list (S361). When the displayed image is not included in the deletion-stack list (S361: NO), the CPU 11 terminates the upper left flick responding process. When the displayed image is included in the deletion-stack list (S651: YES), the deletion icon 52 is blinking on the display unit 17. The CPU 11 causes the deletion icon 52 to stop blinking (S362). Then, in S363, the CPU 11 delete the image currently displayed on the display unit 17 from the deletion-stack list.

Figure 6D:
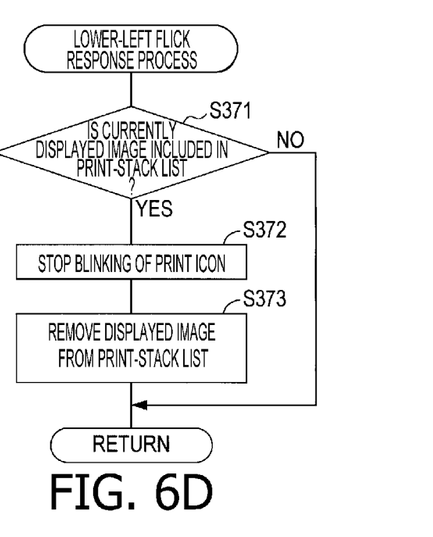

The lower left flick responding process (S370) is shown in FIG. 6D. As illustrated, when the CPU 11 proceeds to the lower left flick responding process, the CPU 11 determines whether the image currently being displayed is included in the print-stack list (S371). When the displayed image is not included in the print-stack list (S371: NO), the CPU 11 terminates the lower left flick responding process. When the displayed image is included in the print-stack list (S371: YES), the print icon 51 is blinking on the display unit 17. The CPU 11 causes the print icon 51 to stop blinking (S372). Then, in S373, the CPU 11 delete the image currently displayed on the display unit 17 from the print-stack list.

Figure 7:
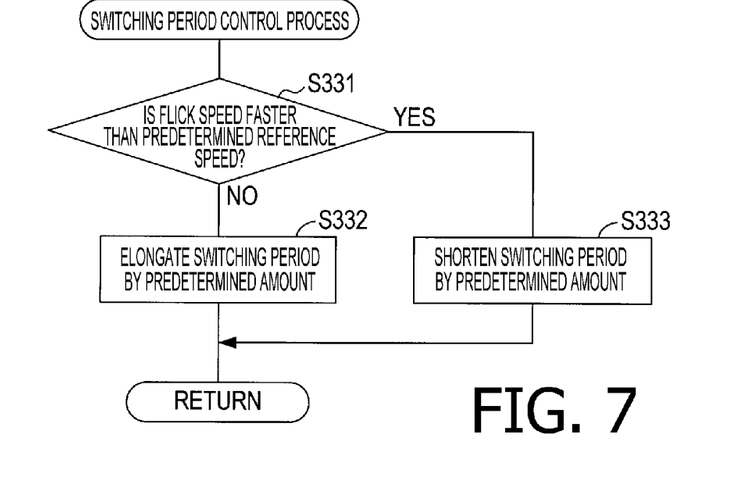
FIG. 7 is a flowchart illustrating a switching interval control process called in the flick-response process shown in FIG. 5.

FIG. 7 illustrates the switching period control process which is executed in S330. As shown in FIG. 7, when the CPU 11 proceeds to the switching period control process, the CPU 11 determines whether a flicking speed is faster than an predetermined speed (S331). When the flicking speed is faster than the predetermined speed (S331: YES), the CPU 11 shortens the current switching period of the slideshow by a predetermined amount. That is, the switching interval of the images in the slideshow is shortened. When the flicking speed is equal to or less than the predetermined speed (S331: NO), the CPU 11 elongates the current switching period of the slideshow by the predetermined amount. That is, the switching interval of the images in the slideshow is elongated.

When the touch operation with the designating member in S250 (see FIG. 4) is not the flick operation (S250: NO), the CPU 11 determines whether a long press is performed in S280. For example, the CPU 11 determines whether the contacting time measured in the count process (S240) is equal to or longer than a predetermined threshold period, and determines that the long press has been made when the contacting time is equal to or longer than the predetermined threshold period. It is noted that the threshold period can be arbitrarily set, and thus, may be set to be equal to the switching period.

When the CPU 11 determines that the long press has been made (S280: YES), the CPU 11 proceeds to S190. That is, when the long press has been made, the slideshow is kept proceeding. Therefore, the same image can be kept displayed without switching to another image by continuing the touch operation other than the flick operation for the predetermined threshold period or more.

Figure 8:
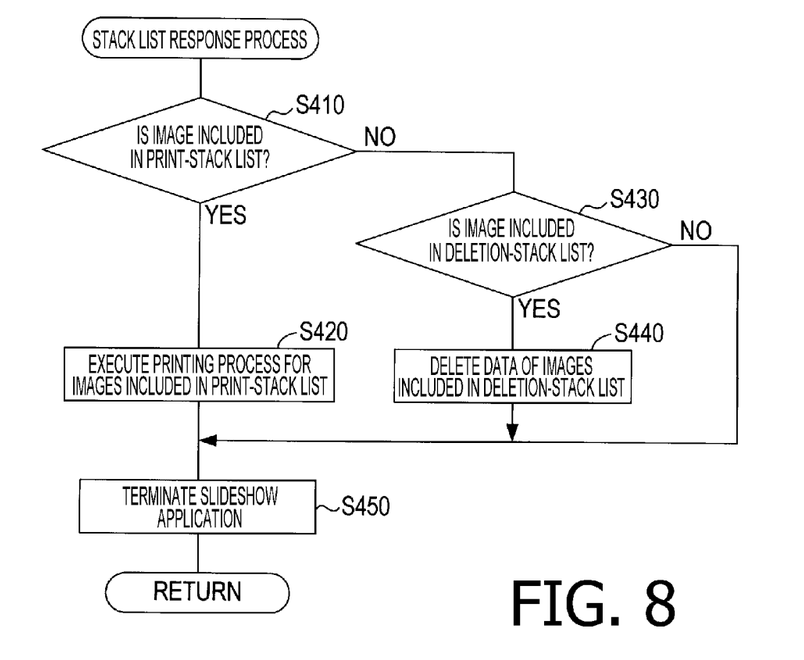
FIG. 8 is a flowchart illustrating a stack list response process called in the slideshow control process shown in FIG. 4.

When the CPU 11 determines that the long press has not been performed (S280: NO), the CPU 11 executes a stack list responding process (S290). Details of the stack list responding process is shown in FIG. 8. When the CPU 11 proceeds to the stack list responding process, firstly the CPU 11 determines whether there is an image in the print-stack list (i.e., whether an image has been added to the print-stack list) in S410. When there is an image in the stack-list (S410: YES), the CPU 11 executes the print process with respect to the image having added to the print-stack list. For example, the CPU 11 transmits the image data of all the images having added to the print-stack list to the MFP 5 to cause the MFP 5 to print the images. After execution of S420, the CPU 11 proceeds to S450 and terminates the slideshow application.

When there is no image in the print-stack list (S410: NO), the CPU 11 determines whether there is an image in the deletion-stack list (i.e., an image has been added to the deletion-stack list) in S430. When there is no image in the deletion-stack list (S430: NO), the CPU 11 proceeds to S450. When there is an image in the deletion-stack list (S430:YES), the CPU 11 executes a deletion process of the images having been added to the deletion stack list. For example, the CPU 11 deletes the image data of all the images having been added to the deletion-stack list from the folder in which the image data is stored.

As described above, when the user performs a flick operation during execution of the slideshow, a process corresponding to the flick operation can be applied to the image that is being displayed when the flick operation is performed.

For example, when the upper right flick operation is performed, the displayed image is set to be print target image. When the lower right flick operation is performed, the displayed image is set to be a deletion target image. Further, even if an image is set to be the print target image or deletion target image, the setting can be released when the image is displayed again. For example, when a print target image is displayed and the lower left flick operation is performed, the image is not the print target image any more. Similarly, when a deletion target image is displayed and the upper left flick operation is performed, the image is not the deletion target image any more.

As above, looking at the images sequentially switched on the display unit 17, the user can determine whether each of the image is to be printed or deleted. Further, setting of each image to be the print target image or the deletion target image can be made by a simple operation (i.e., the flick operation).

Further, according to the exemplary embodiment, when the user touches down the designating member when the slideshow is being executed, the print icon 51 and the deletion icon 52 appear on a right side part of the display area of the display unit 17. Thus, the user can visually recognize that setting of printing/deleting can be done with respect to the image currently displayed.

Further, the displayed positions of the icons 51 and 52 with respect to the central part of the display area correspond to the flick directions to execute the processes corresponding to the icons 51 and 52, respectively. For example, in order to set the image being displayed to the print target image, the upper right flick operation is to be performed, and the display position of the print icon 51 is an upper right position with respect to the central part of the image display area. Similarly, in order to set the image being displayed to the deletion target image, the lower right flick operation is to be performed, and the display position of the deletion icon 52 is a lower right position whit respect to the central part of the image display area.

As described above, the display positions of the icons 51 and 52 are associated with the directions of the flick operation, the user can easily set the image to be the print target image or the deletion target image. For example, when the user touches down on an image, thinking to set the currently displayed image as the print target image, the print icon 51 is displayed on the upper right corner within the image display area of the display unit 17. Thus, the user intuitively recognizes that the upper right flick operation is the operation to set the displayed image to be the print target image.

According to the exemplary embodiment, when all the plurality of (N) images have been displayed sequentially, the slideshow is repeated from the first image, in accordance with the order of the images of the slideshow. That is, until an operation to terminate the slide show (i.e., an operation which is not the flick operation or the long press operation), the slideshow is repeatedly executed.

Further, when the image is displayed second time or later, if the image has been set to be the print target image, the print icon 51 is displayed with blinking when the image is displayed, and if the image has been set to be the deletion target image, the deletion icon 52 is displayed with blinking when the image is displayed. Therefore, the user can easily recognize that the displayed image has been set to be the print target image or the deletion target image.

Further, when the user notes that the displayed image has been set to the print target image or the deletion target image, by performing the flick operation in a direction opposite to the print icon 51 or the deletion icon 52 with respect to the central part of the image display area, the setting of the print target image or the deletion target image can be released. Therefore, the user can easily and conveniently release the setting simply be performing the flick operation.

The user can cause the currently displayed image to be continuously displayed, without switching to the next image, by continuing the touchdown state on the image. Thus, during the slideshow, when the user wishes to look at the image carefully, simply by continuing the touchdown state, the user can look at the image continuously.

Further, by performing a flick operation of which direction is different from the above-described four directions for setting/releasing the print/deletion target, the switching period of the images of the slideshow can be changed. Thus, according to the exemplary embodiment, a value-added slideshow can be provided.

In the exemplary embodiment, as specific processes for the currently displayed image, addition to the print-stack list (set as the print target) and addition to the deletion-stack list (set as the deletion target) are described. The above processes are only examples. Any other processes may be executed for the currently displayed image.

The icons may be displayed anywhere in the image display area. In the exemplary embodiment, the print icon 51 is displayed at the upper right corner within the image display are, and when the flick operation toward the upper right direction is performed, the displayed image is added to the print-stack list. However, this is only an exemplary embodiment, and it is not necessary to associate the location of the icon with the flick direction. That is, the flick direction for adding the image to the print-stack list may be determined regardless of the position of the icon.

As a display method and/or display period, ones different from the above may be employed. For example, regarding the display method, a size and/or a color of the icon may be differentiated to notify whether the image has been added to the stack list.

The exemplary embodiment described above may be modified such that the image can be directly moved from one stack list to another stack list. For example, an image having been included in the print-stack list may be directly moved to the deletion-stack list by performing the flick operation in the lower direction.

Regarding the print and deletion processes, in the exemplary embodiment, they are executed as stack list responding processes (S290) when the slideshow process is terminated. This configuration may be modified such that they are executed at any timings when the slideshow is being executed. For example, printing of an image may be executed at a timing when an image currently displayed is set as the print target.

The number of images simultaneously displayed in the slideshow need not be limited to one. For example, in the slideshow, image images may be displayed simultaneously and switched two by two. In such a case, setting to the print target or deletion target may be done on image basis, or all the images simultaneously displayed may be set to the print targets or the deletion targets simultaneously.

In the above-described exemplary embodiment, as a user operation for setting the displayed image to be the print target or the deletion target, the flick operation is used. It is noted that the similar function may be realized using operations other than the flick operation. For example, a detecting device that detects a user's gesture and process may be determined based on the contents of the user's gesture. For example, when the gesture of the user, who faces the display unit 17, is one appears to shake off the hand in the upper right direction, the currently display image may be added to the print-stack list.

The above-described configuration may be applied to various devices other than the PC 3. For example, even in MFP 5, the slideshow application may be employed. In addition to the above, the configuration may be applied to, for example, mobile information processing terminals, mobile communication terminals, digital cameras and the like which are provided with a display unit.

It is noted that the aspects of the invention need not be limited to those described above with reference to the exemplary embodiment, by can be modified in various ways without departing from the gist of the disclosures. For example, a part of the exemplary embodiment may be replaced with a component which is well-known and having the same function. Further, various modifications such as addition, replacement of components may be done without departing from the gist of the disclosures. Furthermore, above-described exemplary embodiment and modifications may be combined in various ways.

What is claimed is:

1. A non-transitory computer-readable recording medium storing an image information processing program which represents computer-executable instructions that cause a controller of an image information processing device to execute an image information processing, the image information processing device having an obtaining unit configured to obtain an image file which is a data file representing an image, and a display unit configured to display the image, a touch panel arranged to overlay an image display area of the display unit, an operation detecting unit configured to detect an user input to the touch panel, and a controller configured to execute operations in accordance with the image information processing program, wherein, when executed by the controller, the plurality of instructions causing the controller to:
set an image file group, which includes at least one image file obtained by the obtaining unit, to be a target image group;
display images represented by the image files included in the target image group on the display unit sequentially at particular switching intervals;
determine whether one of a plurality of specific flick operations is performed, the specific flick operations being flick operations in particular directions, during displaying the images on the display unit sequentially; and
execute one of the plurality of associated processes to be applied to the image file representing an image which is currently displayed on the display unit when it is determined that one of the plurality of specific flick operations is performed.

2. The non-transitory computer-readable recording medium according to claim 1,
wherein when executed by the controller, the plurality of instructions cause the controller to:
display at least one of auxiliary images respectively representing the associated processes when it is determined that one of the plurality of specific flick operations is performed.

3. The non-transitory computer-readable recording medium according to claim 2,
wherein when executed by the controller, the plurality of instructions cause the controller to:
display the at least one of auxiliary images at respective auxiliary image displaying positions defined within the image displaying area.

4. The non-transitory computer-readable recording medium according to claim 1,
wherein a first flick operation is defined as one of the specific flick operations, and
wherein one of the associated processes which is associated with the first flick operation is a process to set the image file representing the image currently displayed on the display unit to be a print target when the first flick operation is performed.

5. The non-transitory computer-readable recording medium according to claim 1,
wherein a second flick operation is defined as one of the specific flick operations, and
wherein one of the associated processes which is associated with the second flick operation is a process to set the image file representing the image currently displayed on the display unit to be a deletion target when the second flick operation is performed.

6. The non-transitory computer-readable recording medium according to claim 1,
wherein a termination operation is defined, the termination operation being different from the specific flick operations,
wherein when executed by the controller, the plurality of instructions cause the controller to:
determine whether the termination operation is executed based on a detection result of the operation detecting unit;
terminate to display images sequentially when it is determined that the termination operation is executed; and
display on the display unit a process-application image when the every time the image displayed on the display unit is switched to another and the associated process has already been executed.

7. The non-transitory computer-readable recording medium according to claim 6,
wherein a cancellation operation to cancel the associated process is defined, the cancellation operation being different from the specific flick operation, and
wherein when executed by the controller, the plurality of instructions cause the controller to:
determine whether the cancellation operation is performed based on the detection result of the operation detecting unit while the image represented by the image file and the process-application image are displayed on the display unit; and cancel the associated process having been applied to the image when the controller determines that the process cancellation operation is performed.

8. The non-transitory computer-readable recording medium according to claim 6, wherein when executed by the controller, the plurality of instructions cause the controller to:
execute, when the controller determines that the termination operation is performed, a termination process with respect to the image file to which the specific process has been executed before the termination operation is performed.

9. The non-transitory computer-readable recording medium according to claim 1, wherein a display holding operation to hold the image displayed on the display unit in a displayed state is defined, the display hold operation being different from the specific flick operation,
wherein when executed by the controller, the plurality of instructions cause the controller to:
determine whether the display holding operation is executed during the associated process based on the detection result of the operation detection unit: and
keep displaying the image currently displayed on the display unit regardless whether the switching timing is the switching period until a particular holding release condition is satisfied when the controller determines that the display holding operation was performed.

10. The non-transitory computer-readable recording medium according to claim 1, wherein at least one type of period changing operation to change the switching period is defined, the at least one type of period changing operation being different from the specific flick operation, and
wherein when executed by the controller, the plurality of instructions cause the controller to:
determine whether the at least one type of period changing operation is performed based on the detection result of the operation detection unit during changing display images on the display unit; and
change the switching period to a period corresponding to the at least one type of period changing operation when the controller determines that the at least one type of period changing operation is performed.

11. An image information processing method, comprising:
setting at least one image file to be a target image file;
displaying images represented by the at least one image file on a displaying device sequentially at particular switching intervals;
determining whether one of a plurality of specific flick operations is performed, the specific flick operations being flick operations in particular directions, during displaying the images on the display unit sequentially; and
executing one of a plurality of associated processes being to be applied to the image file representing an image which is currently displayed on the display unit when it is determined that one of the plurality of specific flick operations is performed.

12. An image information processing device, comprising:
an obtaining unit configured to obtain an image file which is a data file representing images;
a display unit configured to display the images;
an operation detection unit configured to detect a user operation with respect to the display unit; and
a controller,
the controller being configured to:
set an image file group, which includes at least one image file obtained by the obtaining unit, to be a target image group;
display images represented by the image files included in the target image group on the display unit sequentially at particular switching intervals;
determine whether one of a plurality of specific flick operations is performed, the specific flick operations being flick operations in particular directions during displaying the images on the display unit sequentially; and
execute one of the plurality of associated processes to be applied to the image file representing an image which is currently displayed on the display unit when it is determined that one of the plurality of specific flick operations is performed.

* * * * *